Patented Feb. 21, 1933

1,898,363

UNITED STATES PATENT OFFICE

GEORGE R. GREENBANK, OF WASHINGTON, DISTRICT OF COLUMBIA; DEDICATED TO THE FREE USE OF THE GOVERNMENT AND THE PEOPLE OF THE UNITED STATES

PROCESS OF INHIBITING OXIDATION OF UNSATURATED FATS, OILS, FATTY ACIDS, AND SUBSTANCES CONTAINING FATTY MATERIAL HAVING A TENDENCY TO BECOME RANCID

No Drawing. Application filed September 16, 1932. Serial No. 633,467.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

This invention relates to inhibiting the oxidation and retarding the development of rancidity in fats, oils, fatty acids and substances at least one constituent of which is an organic material, a liquid or solid such as an unsaturated fat, oil, or fatty acid, which has a tendency to undergo a chemical change when placed in storage; and of which another constituent is a polybasic unsaturated aliphatic acid, or a salt, ester, or anhydride thereof, functioning to prevent or inhibit said chemical change of the first mentioned compounds.

Throughout this invention oxidation and development of rancidity are considered synonomous. Likewise inhibitors of oxidation and retarders of the development of rancidity are used interchangeably.

An important aspect of my invention pertains to the retarding of the development of rancidity in fats, oils, and fatty acids and one of the chief objects of my invention from this aspect is to improve the keeping quality of foods and other substances which contain fats, oils, and fatty acids as natural ingredients; also to protect compositions containing fats, oils, and fatty acids from deterioration.

It is well known that unsaturated fats, oils, and fatty acids develop a rancid taste and odor which is quite objectionable in many products. This change is especially marked where the substances are held at elevated temperature or exposed to actinic light.

The addition of various substances to fats, oils, and fatty acids for the purpose of retarding or preventing the development of rancidity therein was proposed many years ago; the substances proposed are (a) quinones, (b) napthols, and (c) phenols. These substances are objectionable in food and in many other products.

I have now discovered that polybasic unsaturated aliphatic acids and certain of their derivatives such as the esters, salts, and anhydrides, are effective in retarding the development of rancidity in unsaturated fats, oils, fatty acids and substances containing fatty material.

The unsaturated polybasic aliphatic acids, esters, salts, and anhydrides which I have found to be useful in retarding the development of rancidity in fats, oils, fatty acids, or compositions may be described generically as unsaturated polybasic aliphatic acid compounds whose molecular structure is in part as follows:

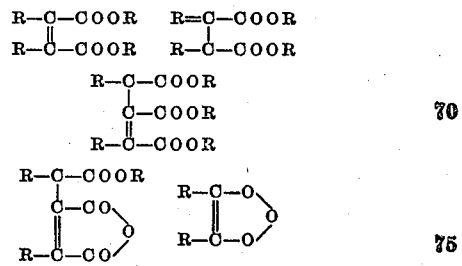

Where R may be one or more hydrogen or metallic atoms or any aliphatic group.

The addition of even as small a quantity as one part in 10,000 parts of fat, oil, or fatty acid effects a marked decrease in the rate of rancidity development under conditions which are normally favorable to such a change.

The above discovery is particularly useful in preserving the freshness of fats, oils, fatty acids and compositions containing these ingredients. The rancidity retarders are, therefore, of great value in preserving the original flavor of foods. They are also valuable where the products of these chemical changes are harmful in their commercial utilization.

The tests of the effect of the new rancidity retarders have been made in the manner described in the paragraphs which follow. The retarding effect is expressed as the protection factor (P. F.) and in some instances in terms of odor and taste.

It has been known for some time that the development of peroxides in fats, oils and fatty acids parallels the development of rancidity. The protection factor (P. F.) is the ratio.

$$\frac{\text{Peroxides in the control sample}}{\text{Peroxides in the treated sample}}$$

For example, in Table I the control sample after 10 days' storage at 42° C. contained 25.6 millimoles of peroxide per liter, while the treated sample contained 8.2 millimoles of peroxide per liter. The protection factor (P. F.) for the substance used would be $$\frac{25.6}{8.2} = 3.1.$$

This basis of comparison of retarders is used wherever possible.

The tests as to the effect of retarders were made as follows: One part of the retarder was mixed with 10,000 parts of fat, oil, fatty acid or composition. The resulting mixture was then placed in storage at 42° C. At definite intervals samples were removed and tested for peroxides or the development of rancidity as indicated by the odor or taste.

In the case of dry milk the retarder was added to the milk before drying. In pie crust the shortening was treated.

Table I.

Various retarders

| Retarder | Millimoles of peroxides per liter | Protection factor (P. F.) | Rancidity perceptible after |
|---|---|---|---|
| | | | Days |
| Control | 25.6 | 1.0 | 10 |
| Maleic acid | 8.2 | 3.1 | 33 |
| Maleic anhydride | 12.7 | 2.0 | 21 |
| Ethyl maleate | 19.6 | 1.3 | 14 |
| Sodium maleate | 22.4 | 1.1 | 12 |
| Aconitic acid | 16.0 | 1.6 | 17 |
| Fumaric acid | 20 | 1.3 | 13 |
| Citraconic acid | 12.8 | 2.0 | 22 |
| Itaconic acid | 13.4 | 1.9 | 20 |

In Table II one part of maleic acid was added to 10,000 parts of oil.

| Oil | Millimoles of peroxide per liter in | | P. F. | Rancidity days | |
|---|---|---|---|---|---|
| | Control | Treated oil | | Control | Treated |
| Sunflower | 27.2 | 8.2 | 3.3 | 12 | 38 |
| Cottonseed | 25.6 | 8.2 | 3.1 | 9 | 28 |
| Peanut | 25.7 | 8.1 | 3.1 | 13 | 37 |
| Butter | 3.2 | 1.2 | 3.5 | 15 | 47 |
| Linseed | 40.0 | 13.3 | 3.0 | | |
| Oleic acid | 20.0 | 6.5 | 3.0 | | |

Table III.—Compositions

| Composition | Rancidity Days at 42° C. | |
|---|---|---|
| | Control | Treated |
| Whole milk powder | 21 | 65 |
| Pie crust (equal parts lard and flour) | 6 | 15 |

Although in the previous tables I have mentioned specifically certain acids, esters, and salts, it will be understood that my invention is not limited to pure substances or compositions containing these particular substances but includes pure substances or compositions containing as rancidity retarders or oxidation inhibitors various other substances falling within the genus described in the previous description.

I claim:

1. The process of retarding the development of rancidity in unsaturated fats, oils, and fatty acids which comprises mixing with such unsaturated fats, oils, and fatty acids, an unsaturated polybasic aliphatic acid.

2. The process of retarding the development of rancidity in unsaturated fats, oils, and fatty acids which comprises mixing such unsaturated fats, oils, and fatty acids with an ester of an unsaturated polybasic aliphatic acid.

3. The process of retarding the development of rancidity in unsaturated fats, oils, and fatty acids which comprises mixing such unsaturated fats, oils and fatty acids with a salt of an unsaturated polybasic aliphatic acid.

4. The process of retarding the development of rancidity in unsaturated fats, oils, and fatty acids which comprises mixing such unsaturated fats, oils, and fatty acids with the anhydride of unsaturated polybasic aliphatic acids.

5. The process of inhibiting oxidation or decomposition of fats, oils, or fatty acids, which comprises the addition of an unsaturated polybasic aliphatic acid thereto.

6. The process of inhibiting oxidation or decomposition of fats, oils, or fatty acids, which comprises the addition of an unsaturated polybasic aliphatic acid compound thereto.

7. The process of inhibiting oxidation or decomposition of fats, oils or fatty acids, which comprises the addition of an anhydride of an unsaturated polybasic aliphatic acid thereto.

8. The process of inhibiting the oxidation or retarding the development of rancidity by adding unsaturated polybasic aliphatic acids to naturally occurring compositions containing fats, oils, and fatty acids.

9. The process of inhibiting the oxidation or retarding the development of rancidity by adding an unsaturated polybasic aliphatic acid compound to naturally occurring compositions containing fats, oils, and fatty acids.

10. The process of inhibiting the oxidation or retarding the development of rancidity by adding anhydrides of unsaturated polybasic aliphatic acids to naturally occurring compositions containing fats, oils, and fatty acids.

11. The process of retarding the development of rancidity by means of the addition of maleic acid to any composition or compound containing the fatty acid radical.

12. The process of retarding the development of rancidity by means of the addition of citraconic acid to any composition or compound containing the fatty acid radical.

13. The process of retarding the development of rancidity or inhibiting oxidation in substances containing the fatty acid radical by means of the addition of unsaturated polybasic aliphatic acid compounds thereto whose structural formula are in part as follows:

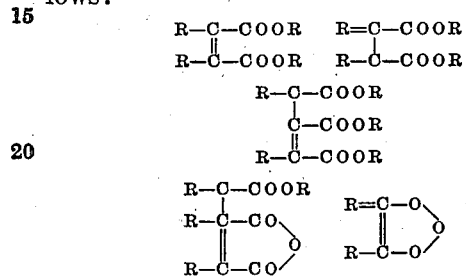

Where R may be one or more hydrogen or metallic atoms or any aliphatic group.

14. A composition containing a fatty material having a tendency to become rancid and an unsaturated polybasic aliphatic acid capable of retarding the development of rancidity of such fatty material.

15. A composition containing a fatty material having a tendency to become rancid and an unsaturated polybasic aliphatic acid compound capable of retarding the development of rancidity.

16. A composition comprising a fatty material having a tendency to become rancid and an anhydride of an unsaturated polybasic aliphatic acid which is capable of retarding the development of rancidity.

17. A composition comprising an unsaturated vegetable oil and an unsaturated polybasic aliphatic acid compound capable of retarding development of rancidity in said oil.

18. A composition comprising an unsaturated vegetable oil and an unsaturated polybasic aliphatic acid capable of retarding development of rancidity in said oil.

19. A composition comprising an unsaturated vegetable oil and anhydrides of an unsaturated polybasic aliphatic acid compound capable of retarding development of rancidity in said oil.

20. A composition comprising an unsaturated animal fat and an unsaturated polybasic aliphatic acid compound capable of retarding the development of rancidity.

GEORGE R. GREENBANK.